US010042390B2

(12) United States Patent
Chao et al.

(10) Patent No.: US 10,042,390 B2
(45) Date of Patent: Aug. 7, 2018

(54) DISPLAY DEVICE HAVING FLEXIBLE FIXING DESIGN (71) Applicant: AU OPTRONICS CORPORATION, Hsin-Chu (TW)

(72) Inventors: Chih-Shan Chao, Hsin-Chu (TW); Tien-Cheng Lee, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/229,522

(22) Filed: Aug. 5, 2016

(65) Prior Publication Data
US 2017/0048989 A1 Feb. 16, 2017

(30) Foreign Application Priority Data

Aug. 14, 2015 (TW) .............................. 104126599 A (51) Int. Cl.
*G06F 1/16* (2006.01)
*H04N 5/64* (2006.01)
*G02F 1/1333* (2006.01)

(52) U.S. Cl.
CPC .......... *G06F 1/1637* (2013.01); *G06F 1/1601* (2013.01); *G02F 2001/133322* (2013.01); *G02F 2201/46* (2013.01); *G06F 2200/1612* (2013.01); *H04N 5/64* (2013.01)

(58) Field of Classification Search
CPC ... G02F 1/133308; G02F 2001/133322; G02F 2201/465; G02F 2001/133328; G06F 1/1637; G06F 1/1601; G06F 2200/1612; H04N 5/64
See application file for complete search history.

(56) References Cited

U.S. PATENT DOCUMENTS 7,304,837 B2 12/2007 Lo et al.
7,936,414 B2 * 5/2011 Hsiao ................ G02F 1/133308
345/87
(Continued)

FOREIGN PATENT DOCUMENTS

| CN | 102944953 A | 2/2013 |
| TW | M311906 | 5/2007 |
| TW | 200741298 | 11/2007 |

OTHER PUBLICATIONS

Office Action dated Jul. 7, 2016 in corresponding patent application in Taiwan.
(Continued)

*Primary Examiner* — Steven T Sawyer
*Assistant Examiner* — Sagar Shrestha
(74) *Attorney, Agent, or Firm* — McClure, Qualey & Rodack, LLP (57) ABSTRACT A display module of the present invention is provided, which includes a supporting frame and a display panel. The supporting frame has a sidewall and a bank, wherein the bank protrudes from an outer side of a supporting surface of the sidewall toward a direction away from the supporting surface. Slits are formed at two sides of the bank by down-cutting, and a hole is formed on the sidewall below the bank. The display panel is disposed on the supporting frame; a bottom surface of the display panel is supported by the supporting surface, and the bank faces an end surface of the display panel.

13 Claims, 12 Drawing Sheets (56) References Cited

U.S. PATENT DOCUMENTS

| | | | | |
|---|---|---|---|---|
| 8,870,439 B2* | 10/2014 | Cheng | ................... | G02B 6/005 362/632 |
| 2003/0043312 A1* | 3/2003 | Nishida | ............. | G02F 1/133308 349/58 |
| 2004/0109104 A1* | 6/2004 | Lee | ................... | G02F 1/133308 349/58 |
| 2006/0087601 A1* | 4/2006 | Lee | ................... | G02F 1/133308 349/60 |
| 2006/0139889 A1* | 6/2006 | Lin | ................... | G02F 1/133308 361/715 |
| 2006/0171170 A1* | 8/2006 | Lee | ...................... | G02B 6/0088 362/632 |
| 2007/0274670 A1 | 11/2007 | Tsai et al. | | |
| 2008/0101001 A1* | 5/2008 | Shin | ................... | G02B 6/0088 361/679.01 |
| 2009/0180244 A1* | 7/2009 | Kiyohara | ............ | G02F 1/13338 361/679.01 |
| 2010/0073594 A1* | 3/2010 | Miyazaki | .......... | G02F 1/133308 349/58 |
| 2010/0177124 A1* | 7/2010 | Ryu | ................... | G02F 1/133308 345/690 |
| 2012/0162880 A1* | 6/2012 | Yoon | ........................ | H04N 5/64 361/679.01 |
| 2013/0083512 A1* | 4/2013 | Park | .................. | G02F 1/133308 362/97.1 |
| 2013/0286477 A1* | 10/2013 | Lee | ........................ | G02B 27/22 359/477 |
| 2013/0301239 A1* | 11/2013 | Yu | ........................... | F21V 15/01 362/97.1 |
| 2016/0066449 A1* | 3/2016 | Hsiao | ................ | G02F 1/133308 361/679.01 |
| 2016/0077372 A1* | 3/2016 | Lee | ................... | G02F 1/133308 349/58 |

OTHER PUBLICATIONS

Office Action dated Jun. 28, 2017 in corresponding patent application in China.

* cited by examiner

DISPLAY DEVICE HAVING FLEXIBLE FIXING DESIGN

BACKGROUND OF THE INVENTION

1. Field of the Invention

The present invention relates to a display module; particularly, the present invention relates to a display module having flexible fixing mechanism.

2. Description of the Prior Art

A display device is generally composed of a display panel, a backlight module, a plastic frame, and an outer frame. Traditionally, the display panel is disposed on the plastic frame. The plastic frame limits the moving of the display panel on the plane where the plastic frame is located and fixes the display panel. However, the reserved intervals between the plastic frame and end surfaces of the display panel are limited, and end surfaces of the display panel may be in contact with the plastic frame and further laterally pressed by the plastic frame when ambient temperature or internal temperature change due to the operation of the display device. Meanwhile, light generated by the backlight module may have uneven brightness or leakage problem at the place where the display panel is pressed.

This problem is particularly important for display device with narrow frame design. Although utilizing narrow frame technique may reduce the space occupied by the plastic frame and the outer frame around the peripheral area of the display device and increase the display area, the display device having narrow frame design may have even smaller intervals between the plastic frame and end surfaces of the display panel, and thus the aforementioned optical problem is more critical and generates uneven brightness on the peripheral position of the display device. Such a display effect is not ideal and should be improved.

SUMMARY OF THE INVENTION

It is an object of the present invention to provide a display module having less light leakage that is generated from compression of a supporting frame and maintaining assembly reliability.

It is another object of the present invention to provide a display module having less stress exerting on the display panel caused by thermal expansion and contraction.

The display module includes a supporting frame and a display panel. The supporting frame has a sidewall and a bank. The bank protrudes from an outer side of a supporting surface of the sidewall toward a direction away from the supporting surface. Slits are formed at two sides of the bank by down-cutting, and a hole is formed on the sidewall below the bank. The display panel is disposed on the supporting frame; a bottom surface of the display panel is supported by the supporting surface, and the bank faces an end surface of the display panel. By the design of partially separating two sides of the bank away from the sidewall, the bank has flexibility to move outward and can reduces lateral pressing force exerted on the display module by the supporting frame when the display panel is pressed by the supporting frame.

DETAILED DESCRIPTION OF THE PREFERRED EMBODIMENT

The present invention provides a display module, where a supporting frame of the display module has a design of a bank. The bank is flexible while it is pressed, so as to reduce stress generated when the supporting frame presses the display panel. In a preferred embodiment, the display module is preferably utilized in a planar display device, such as a liquid crystal display device.

Figure 1:
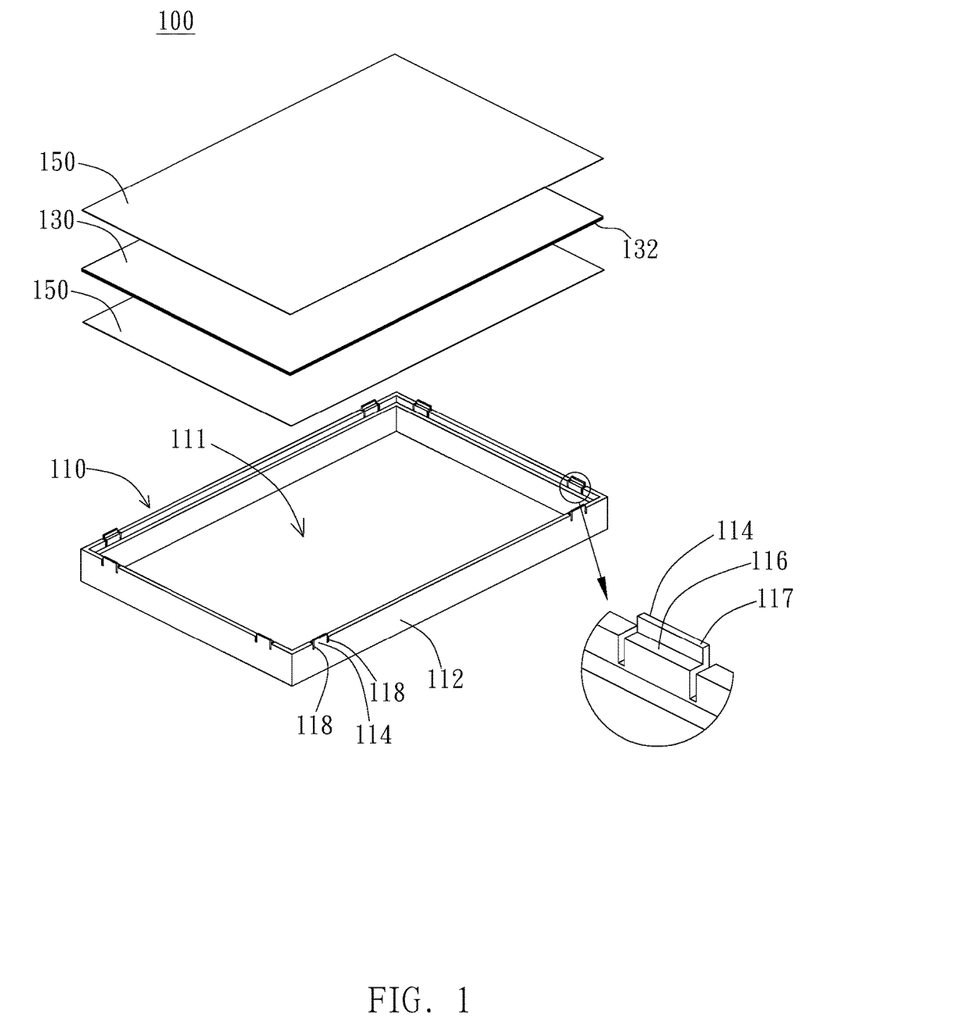
FIG. 1 illustrates an exploded view of an embodiment of a display module of the present invention.

FIG. 1 illustrates an exploded view of an embodiment of a display module of the present invention. As shown in FIG. 1, the display module 100 includes a supporting frame 110 and a display panel 130. The display panel 130 is disposed on the supporting frame 110, and polarizer plates 150 may be alternatively disposed at an upper side and a lower side of the display panel 130. The supporting frame 110 has a sidewall 112 and the bank 114, and the bank 114 faces an end surface 132 of the display panel 130. Please refer to FIG. 1 and FIG. 2A. As shown in FIG. 1, an accommodation space 111 is surrounded by the supporting frame 110 for containing the display panel 130. In a preferred embodiment, a backlight module (not shown) can be also disposed in the accommodation space 111 to provide backlight. The sidewall 112 has a supporting surface 116 formed at an inner side of the bank 114. As shown in the cross-sectional view of FIG. 2A, a bottom surface 134 of the display panel 130 is supported by the supporting surface 116. The bank 114 preferably protrudes from an outer side of the supporting surface 116 of the sidewall 112 toward the direction away from the supporting surface 116, i.e. in the cross-sectional view shown in FIG. 2A, the bank 114 protrudes vertically from the supporting surface 116, so that a height difference exists between a top surface 117 of the bank 114 and the supporting surface 116 for constraining movement of the display panel 130 in the horizontal direction.

Figure 2A:
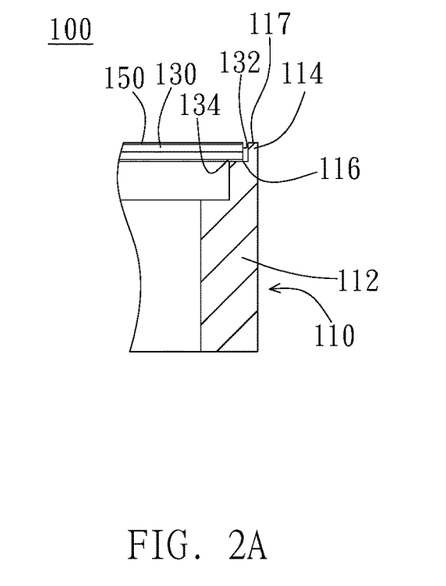
FIG. 2A illustrates a cross-sectional view of an embodiment of the display module of the present invention.
Figure 2B:
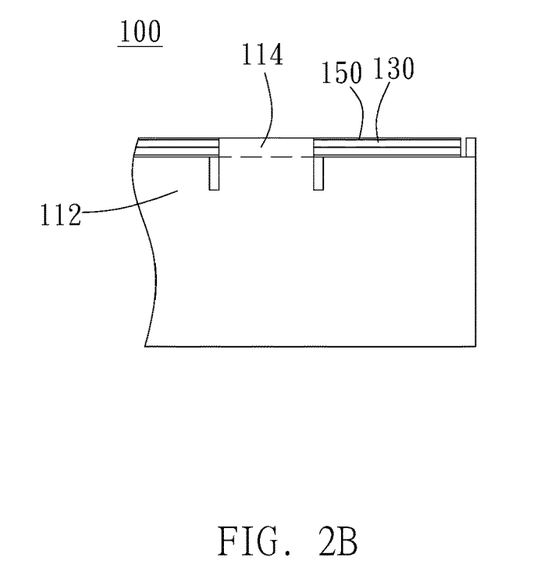
FIG. 2B illustrates a side view of an embodiment of the display module of the present invention.

As shown in FIG. 2A, the bank 114 faces the end surface 132 of the display panel 130. In this embodiment, the height of the sidewall 112 at two sides of the bank 114 is lower than the height of the bank 114. As shown in FIG. 2B, the display panel 130 is located on the supporting surface (the horizontal position of the supporting surface is labeled as the broken line on the bank 114). A portion of the end surface of the display panel 130 is shielded by the bank 114, and other portions of the same are exposed out of the sidewall 112 and the bank 114. By utilizing the bank 114, the movement of the display panel 130 along the horizontal direction can be limited, and the contacting area between the supporting frame 110 and the end surface of the display panel 130 can be reduced to prevent light leakage.

Figure 2C:
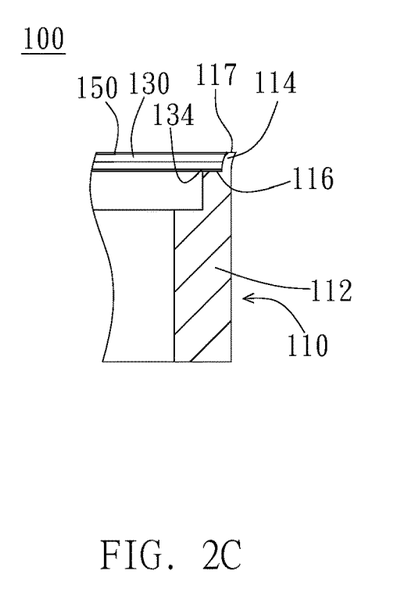
FIG. 2C illustrates a cross-sectional view showing that the display module pushes the bank.

As shown in FIG. 1, slits 118 are formed at two sides of the bank 114 by down-cutting the sidewall 112. In this embodiment, the bank 114 protrudes from the supporting surface 116, and slits 118 are formed by down-cutting the sidewall 112 from the supporting surface 116; therefore, slits 118 are substantially located below the bank 114 but not limited to. In an embodiment, the sidewall 112 and the bank 114 are preferably formed in one-piece, and the bank 114 is formed by cutting the sidewall 112 as mentioned above. However, in another embodiment, the sidewall and the bank can be separated structures. For example, an indentation region is formed on a position of the sidewall prepared to dispose the bank (e.g. the position in the circle illustrated in FIG. 1), and then the bank is assembled in the indentation region, so that the bank protrudes above the supporting surface; in addition, the bank and two sides of the sidewall are spaced away from each other with slits. By down-cutting slits, the bank has a design that separates the bank from two sides of the sidewall to create flexibility. FIG. 2C is a cross-sectional view showing that the display module pushes the bank. As shown in FIG. 2C, when the display panel 130 is pressed by the supporting frame 110, the bank 114 with flexibility moves outward to reduce the pressing force exerted on the display panel 130.

Figure 3:
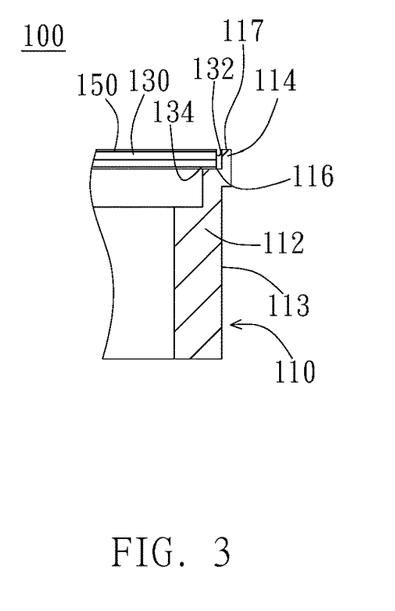
FIG. 3 illustrates a cross-sectional view of different embodiment of the supporting frame.

FIG. 3 is a cross-sectional view of different embodiment of the supporting frame. As shown in FIG. 3, an outer surface 113 of the sidewall 112 retreats inwardly from the bank 114 to form a concave region below the bank 114. The concave region can be utilized for assembling with an outer frame to reduce the space occupied by the supporting frame 110 and the outer frame. By this design, the display module not only can reduce the light leakage, but also can narrow the total frame width.

Figure 4:
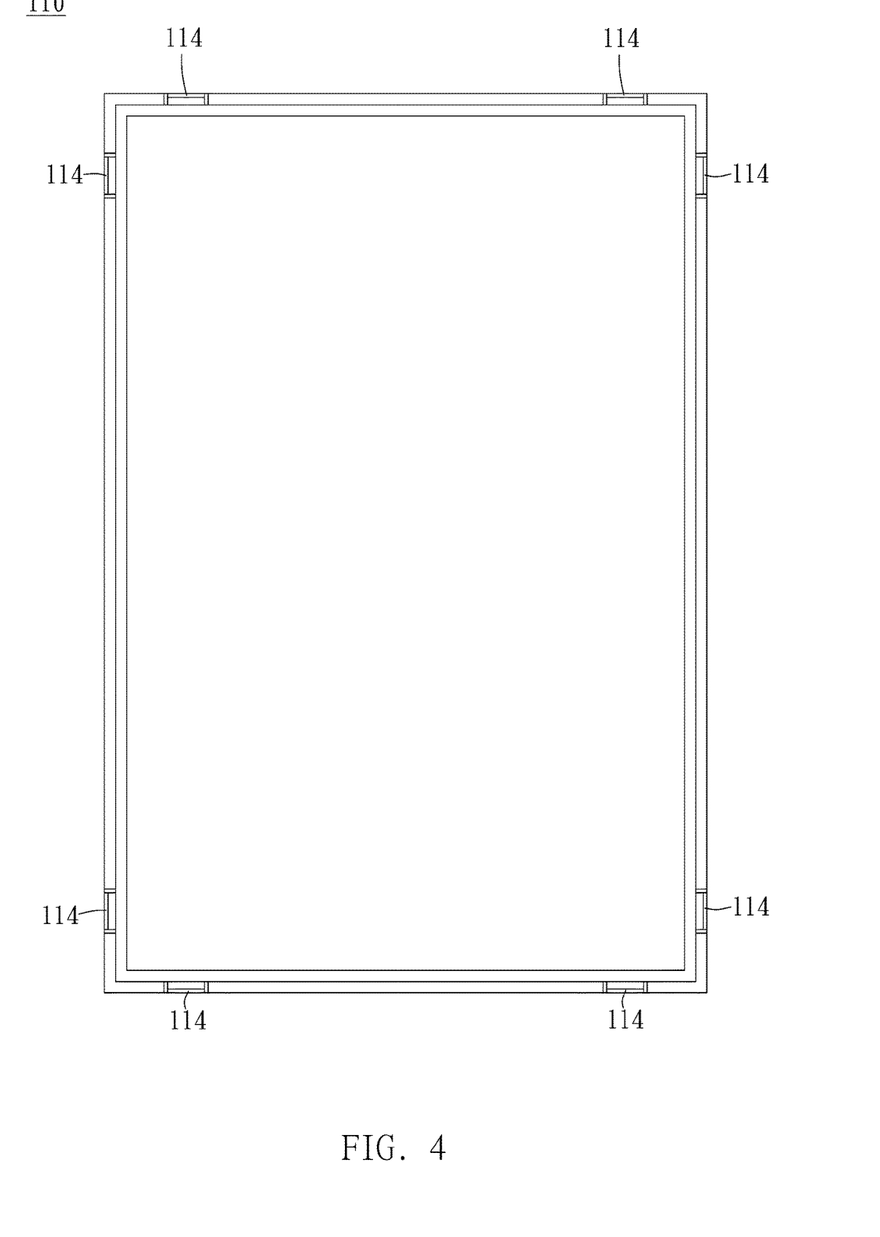
FIG. 4 illustrates a top view of an embodiment of the supporting frame.
Figure 5:
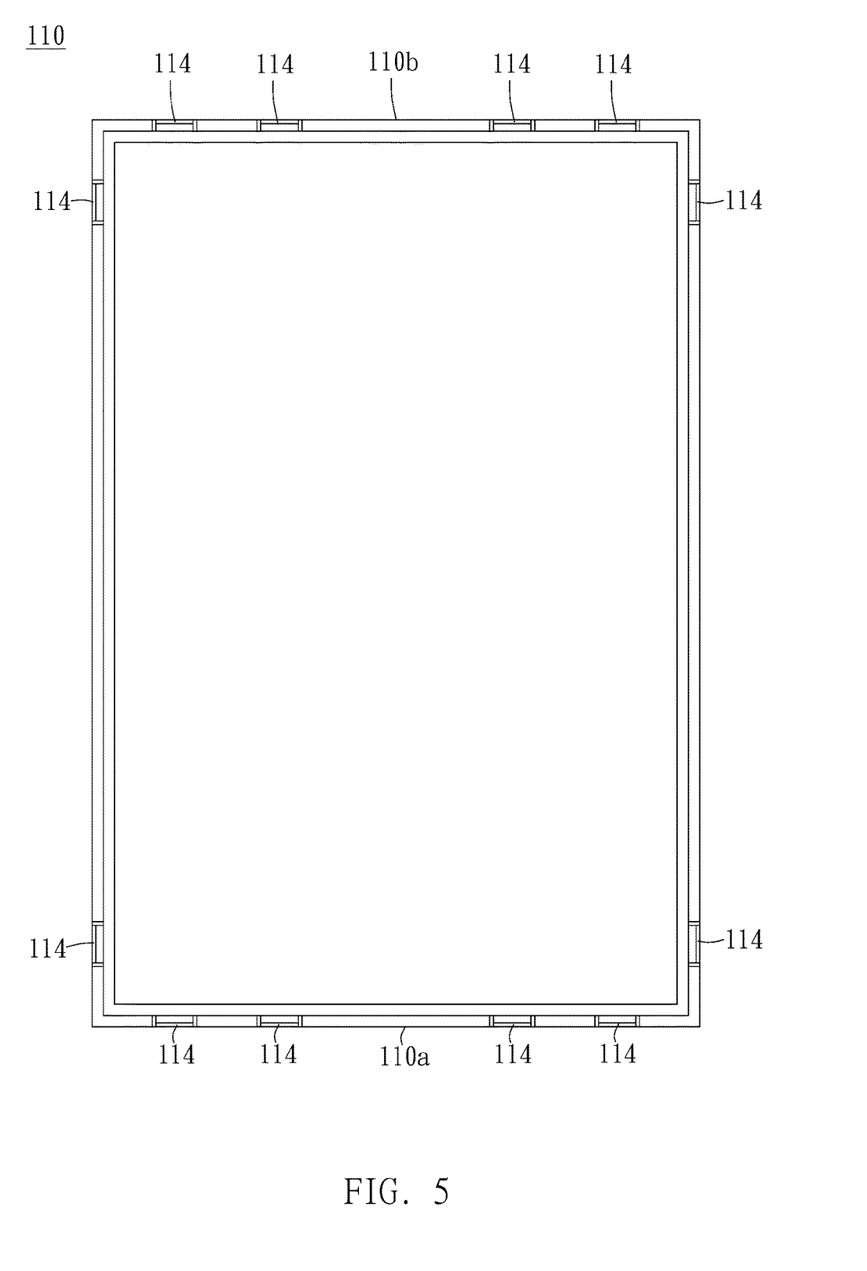
FIG. 5 and FIG. 6A are top views of different embodiments of the supporting frame.
Figure 6A:
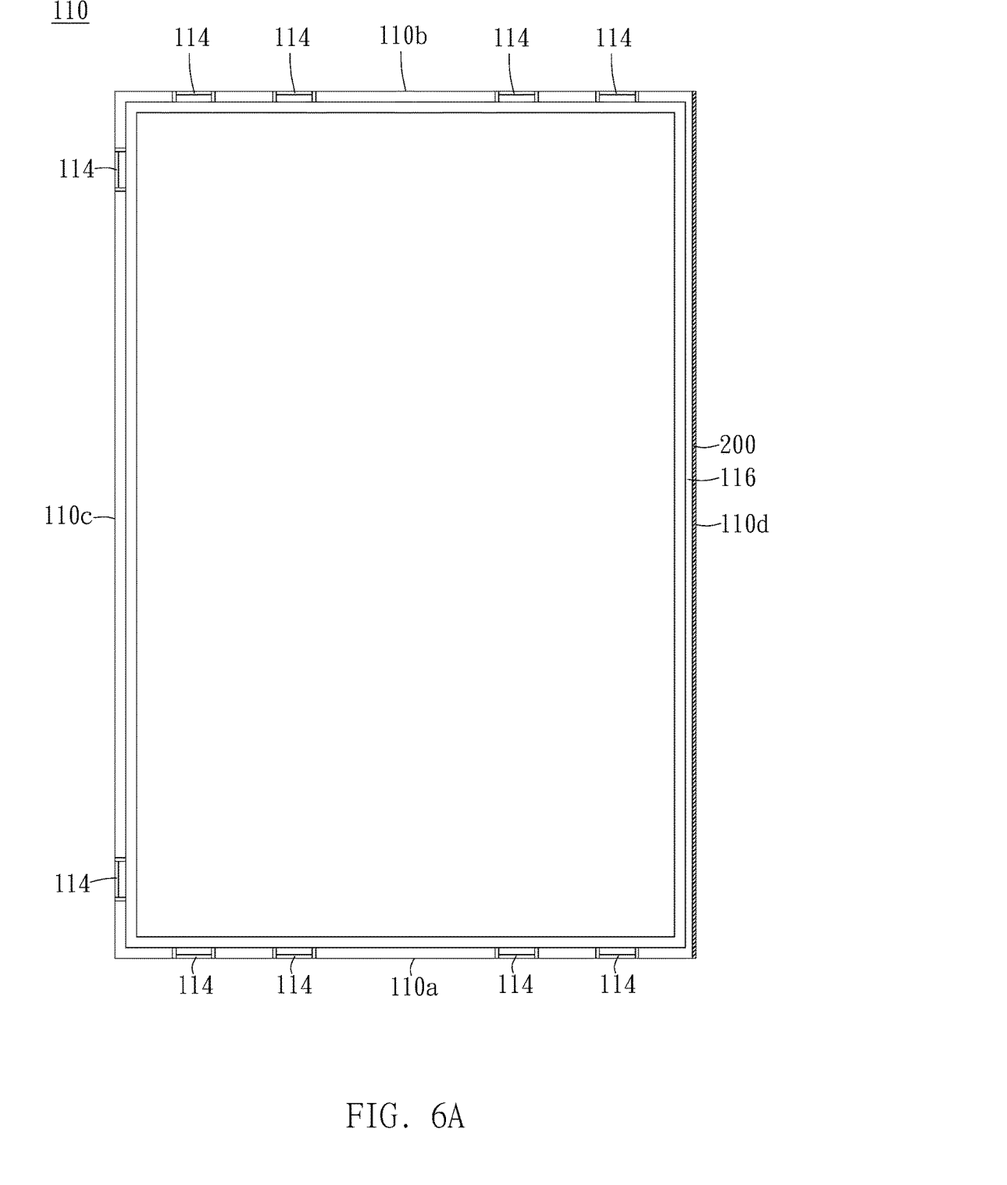

Regarding disposal of the bank, please refer to the description of FIGS. 4, 5, and 6A. FIG. 4 is a top view of an embodiment of the supporting frame 110. As shown in FIG. 4, banks 114 are formed near four corners of the supporting frame 110. By this design, the lateral compression force exerted on the display module by the supporting frame 110 can be reduced at positions of the banks 114 when the display panel is pressed by the supporting frame 110, and the light leakage problem can be therefore solved. Besides, the number and the forming position of the bank 114 can be adjusted depending on different demands. For example, please refer to FIG. 5 and FIG. 6A that are top views of different embodiments of the supporting frame. As shown in FIG. 5, a plurality of banks 114 is formed along two short side edges (110a, 110b) of the supporting frame 110, but not limited to, additional banks may be disposed along two long side edges (110c, 110d). By this design, those banks help to reduce the lateral force exerted on the display panel by the supporting frame.

As shown in FIG. 6A, a plurality of banks 114 are formed along two short side edges (110a, 110b) and the long side edge 110c of the supporting frame 110, and the other long side edge 110d does not have the bank 114. In this embodiment, the long side edge 110d, without the bank 114, adopts a buffer material to reduce light leakage caused by compression on the display panel. As shown in cross-sectional view of FIG. 6B, the bottom surface 134 of the display panel 130 is supported by the supporting surface 116 of the supporting frame 110. The outer frame 170 covers the display panel 130, and the buffer material 200 is disposed on the outer frame 170.

Figure 6B:
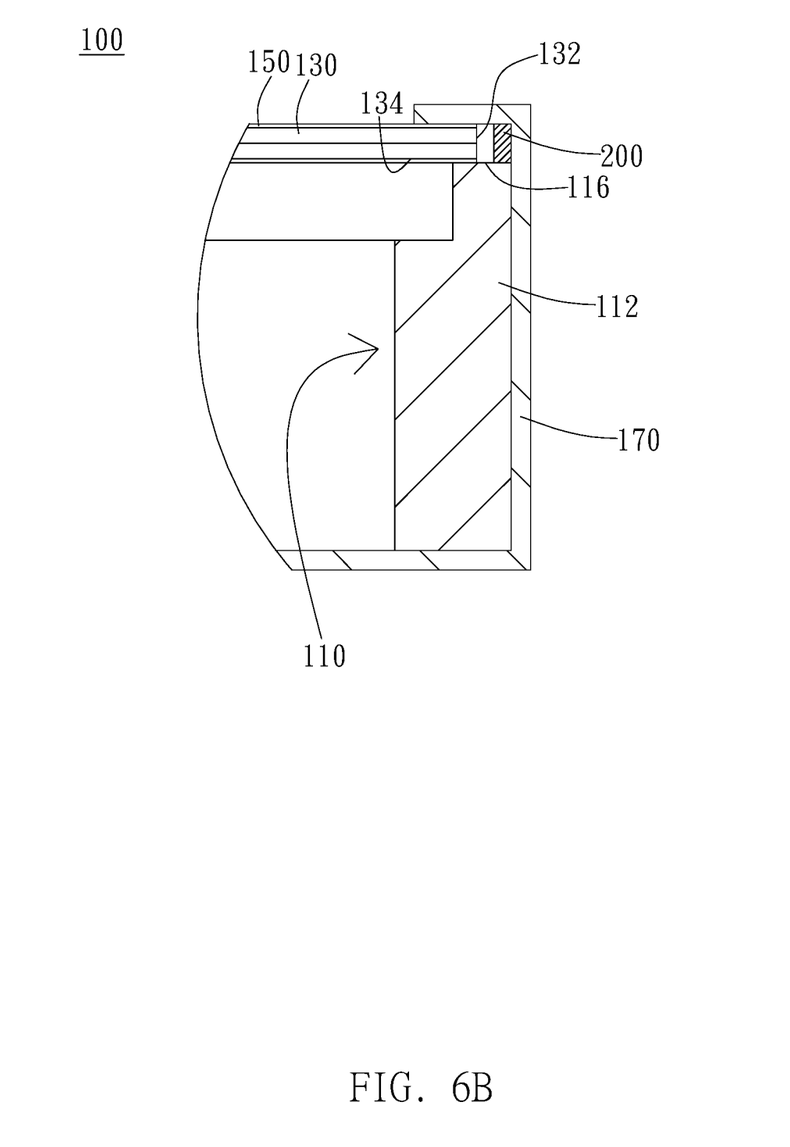
FIG. 6B illustrates a cross-sectional view corresponding to the embodiment shown in FIG. 6A.

The buffer material 200 can be filled between the outer frame 170 and the end surface 132 of the display panel 130. In other words, the buffer material 200 faces one of the end surfaces of the display panel 130 (at the same side with the long side edge 110d), and the plurality of banks 114 are distributed at other end surfaces, respectively. For a larger sized display panel, since the bottom edge (e.g. the aforementioned long side edge 110d) of the display panel is a weight-bearing edge after the display panel is hung, the weight-bearing side may easily have light leakage phenomenon. By this design, the display panel can utilize the buffer material filled between the outer frame and the end surface of the bottom edge. Because the buffer material has better flexibility, the buffer material can further reduce pressing force exerted on the display panel for reducing light leakage while other end surfaces of the display panel can remain fixed by the banks.

Figure 7A:
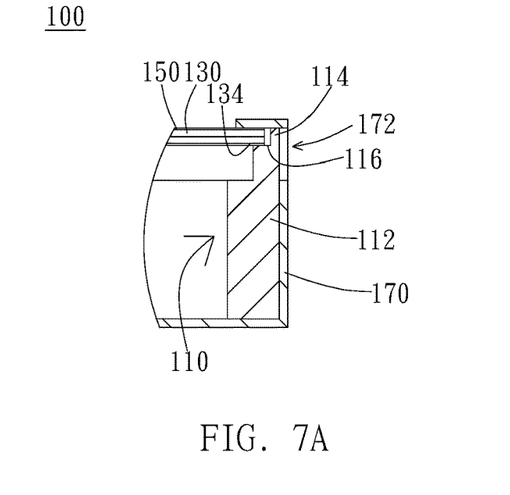
FIGS. 7A and 7B are schematic views of an embodiment showing that the supporting frame is disposed in the outer frame.
Figure 7B:
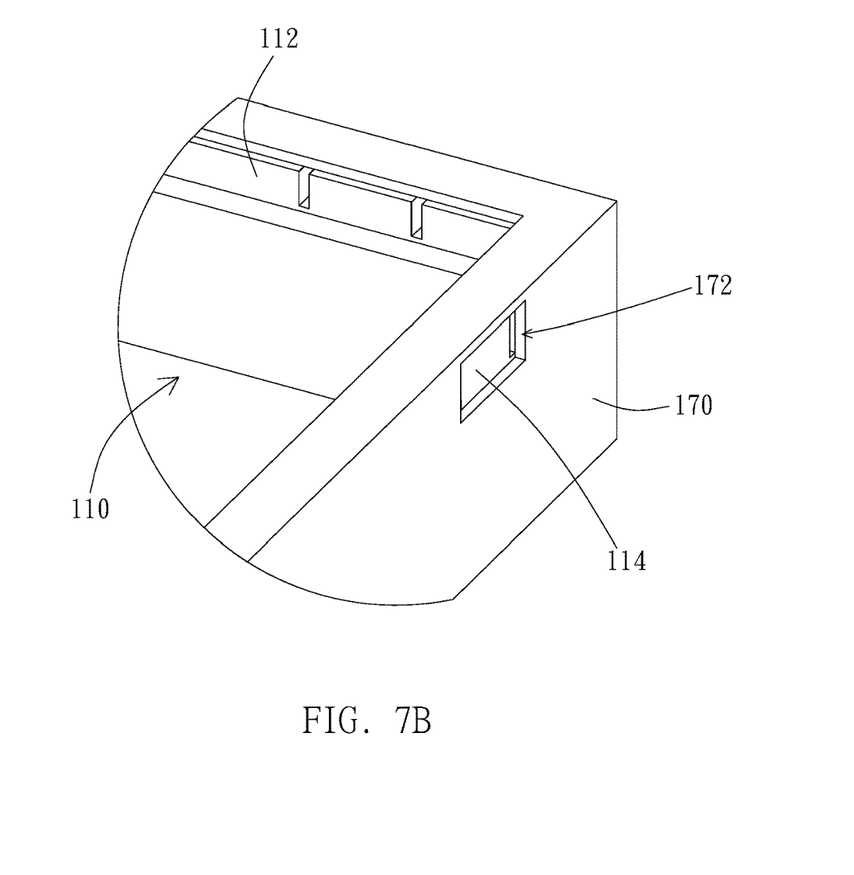
Figure 7C:
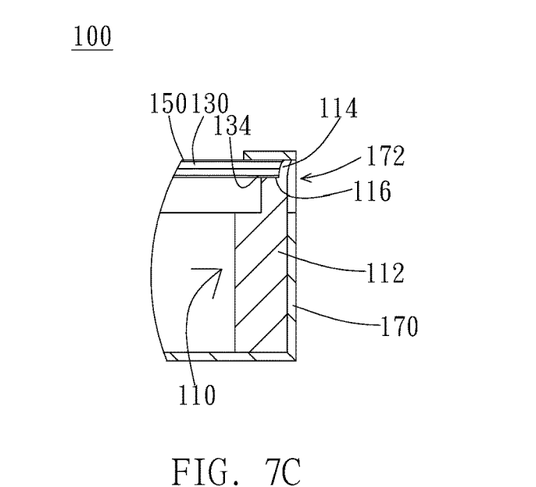
FIG. 7C illustrates a cross-sectional view showing that the display module pushes the bank.

Please refer to FIG. 7A and FIG. 7B showing the supporting frame and the outer frame. As shown in FIG. 7A, the display module 100 includes the outer frame 170. The outer frame 170 covers the display panel 130 and surrounds an outer side of the sidewall 112. As shown in FIG. 7B (illustrating the supporting frame and the outer frame only), a through hole 172 is formed on the outer frame 170 and corresponds to the bank 114 for allowing the bank 114 to move toward the through hole 172. By this design, when the display panel 130 is pressed by the supporting frame 110, as shown in FIG. 7C, the bank 114 is flexible to move toward the outer frame 170, and the through hole 172 formed on the outer frame 170 reserves the space for the bank 114 to move into. Thus, the through hole 172 prevents the bank 114 from being stopped by the outer frame 170 when the bank 114 is moving outward and therefore reduces light leakage.

Figure 8A:
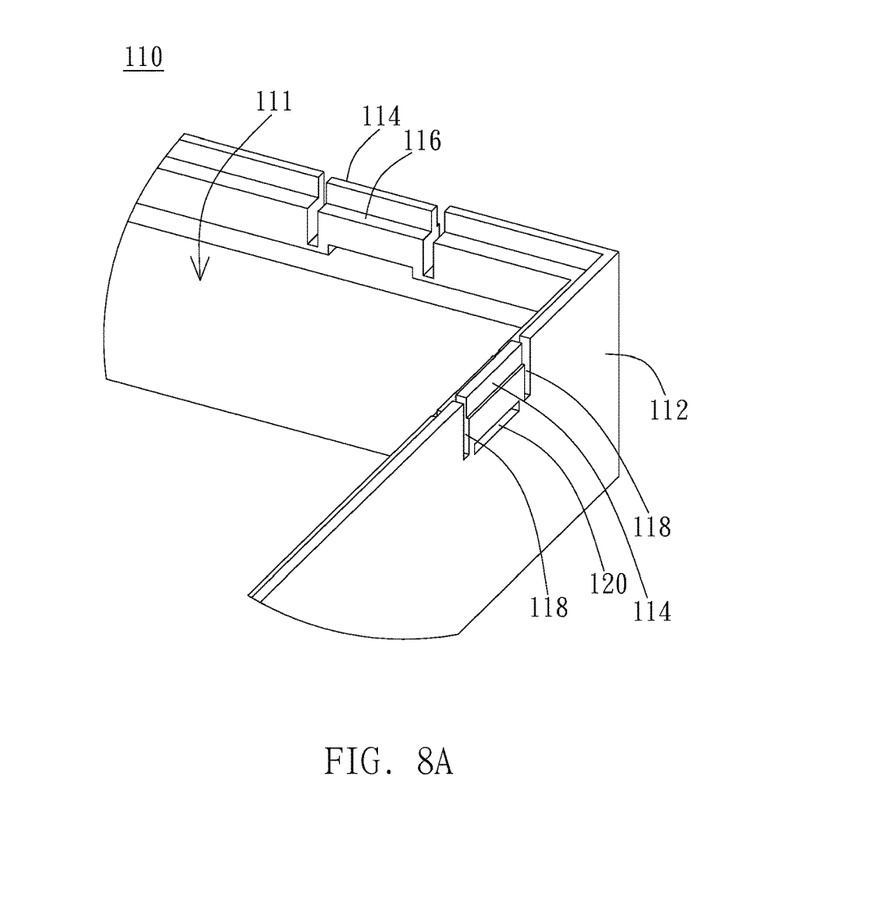
FIGS. 8A, 8B, and 8C are schematic views of another embodiment of the display module of the present invention.
Figure 8B:
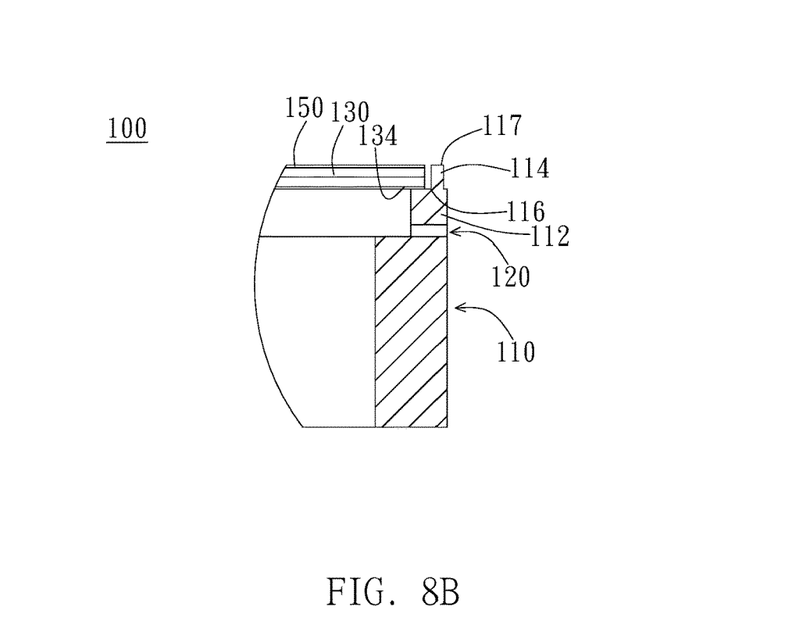

In addition to the design only using the banks, in other embodiments, the supporting frame can be adjusted, depending on different demands, to have the display panel positioned by the bank and the sidewall together. Please refer to FIGS. 8A, 8B, and 8C. As shown in FIG. 8A, the supporting frame 110 has the sidewall 112 and the bank 114. The sidewall 112 has the supporting surface 116 formed at the inner side of the supporting frame 110. Slits 118 are formed at two sides of the bank 114 by down-cutting the sidewall 112. The bank 114 protrudes from the outer side of the supporting surface 116 toward the direction away from the supporting surface 116. As shown in FIG. 8B, the display panel 130 is disposed on the supporting frame 110. The bottom surface 134 of the display panel 130 is supported by the supporting surface 116. The bank 114 faces the end surface 132 of the display panel 130.

Figure 8C:
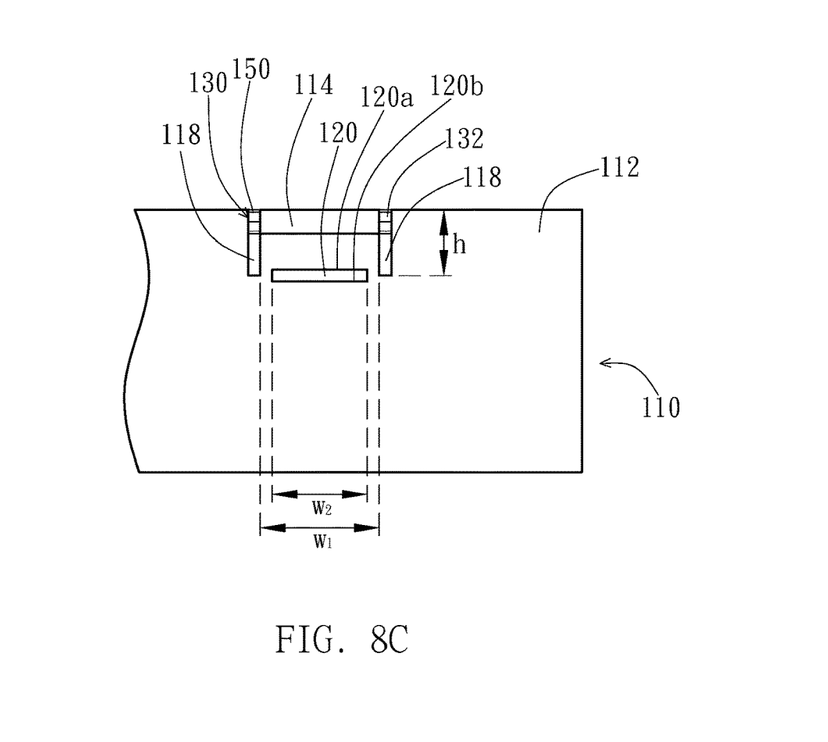

Please refer to FIGS. 8A and 8C. As shown in FIG. 8A, a hole 120 on the sidewall is formed below the bank 114 and is lower than the supporting surface 116. The hole 120 is preferably elongated and perpendicular to the slits 118. As shown in the side view of FIG. 8C, the slits 118 are formed between the sidewall 112 and two sides of the bank 114. The slit 118 has sufficient depth (h) to go beyond the top edge 120a of the hole 120. In other words, the slit 118 extends downwardly to a horizontal position lower than the top edge 120a of the hole 120, so that the bank 114 connects the sidewall 112 only at two sides of the hole 120. By this design, two sides of the bank 114 separate from the sidewall 112, and the connection area of the lower portion of the bank 114 and the sidewall 112 is reduced. As such, the flexibility of the bank 114 can be further increased. In a preferred embodiment, the slit 118 has sufficient the depth (h) to go beyond the bottom edge 120b of the hole 120, so that the sidewall 112 located at two sides of the hole 120 is shaped in two pillars for connecting the upper portion and the lower portion of the hole 120 and further reducing connection area of the lower portion of the bank 114 and the sidewall 112; thus the bank is more flexible.

On the other hand, the width ($W_1$) of the bank 114 is preferably slightly larger than the width ($W_2$) of the hole 120. Specifically, the width ratio ($w_1:w_2$) of the bank 114 to the hole 120 in a direction parallel to the supporting surface is preferably between 7:3 and 7:6. In a more preferred embodiment, the width ratio of the bank 114 to the hole 120 in the direction parallel to the supporting surface is substantially 7:5. By this design, the bank 114 can be flexible and maintain structural strength to provide a better constrain of the display panel 130.

Besides, the height of the bank 114 and the height of the sidewall 112 can be adjusted to achieve different the fixation results. As shown in FIG. 8A, the sidewall 112 at two sides of the bank 114 has the same height as the bank 114. As shown in the embodiment of FIG. 8C, the sidewall 112 at two sides of the bank 114 also faces the end surface 132 of the display panel 130, i.e., the end surface 132 of the display panel 130 is shielded by the bank 114 and the sidewall 112. In this embodiment, the position of the bank 114 slightly retreats from the sidewall 112 (referring to FIG. 8A, the bank 114 retreats inwardly to the accommodation space 111), so that the display panel 130 is able to make early contact with the bank 114 to reduce the compression force when the display panel 130 is pressed by the supporting frame 110. By this design, the bank 114 and the sidewall 112 together constrain the movement of the display panel 130, increase the fixation strength, and reduce light leakage phenomenon.

Figure 9:
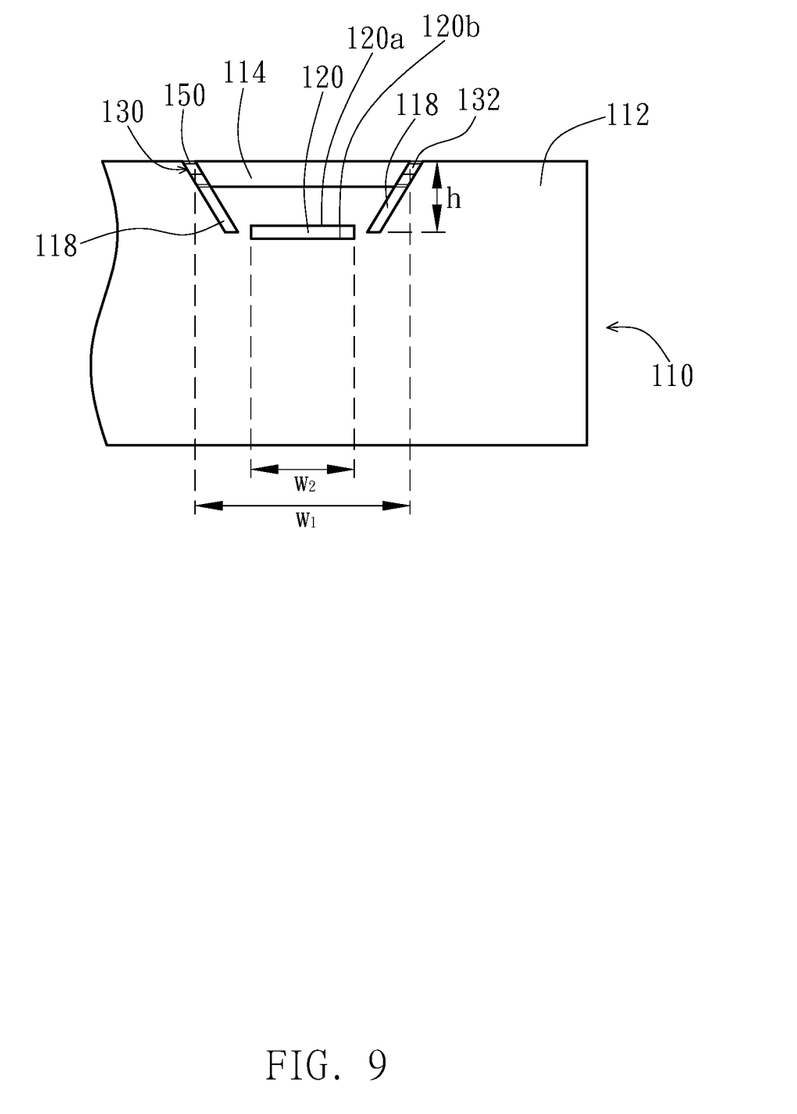
FIG. 9 illustrates a side view of an embodiment showing that the sidewall has different slits.

FIG. 9 is a side view of an embodiment showing that the sidewall has different slits. As shown in FIG. 9, the difference between FIG. 9 and the aforementioned embodiments is that the slits 118 are in a form of oblique breaches formed at two sides of the bank 114 by obliquely down-cutting the sidewall 112, and slits become closer to the hole 120 with the down-cutting depth increasing. As such, the bank 114 has a shape of wide top and narrow bottom. In other words, the width ($w_1$) of the bank 114 becomes narrower when the down-cutting depth of slits 118 increases. By this design, the upper portion of the bank 114 can have a larger area shielding the end surface of the display panel 130, i.e. the light leakage region corresponding to the end surface of the display panel 130 decreases. At the lower portion of the bank 114, the distance between the slits 118 and the hole 120 can be adjusted to change the connection area between the sidewall 112 and the lower portion of the bank 114, and thus the bank 114 is able to flexibly fix the display panel 130.

Figure 10A:
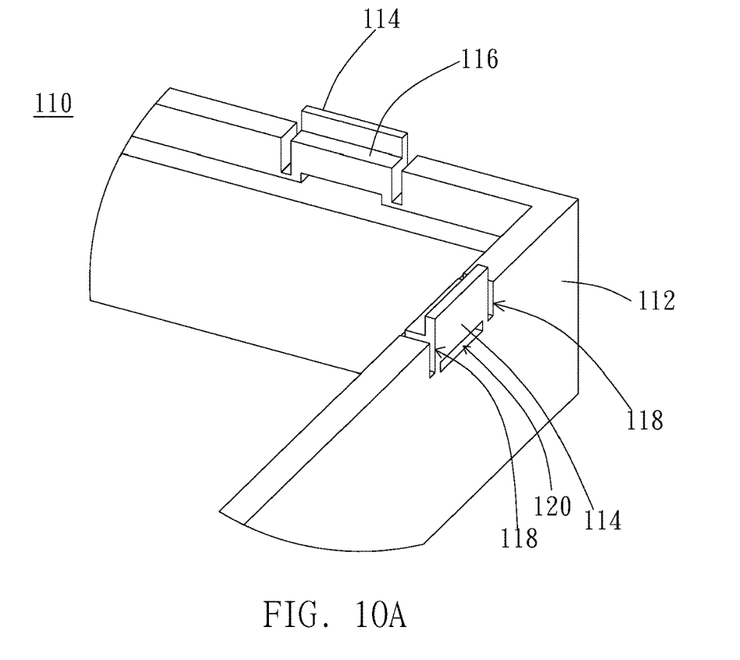
FIGS. 10A, 10B, and 10C are schematic views of another embodiment of the display module of the present invention.
Figure 10B:
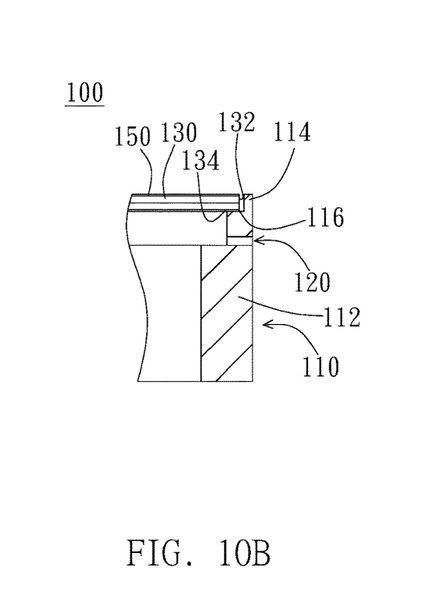

Besides, the hole can be further utilized to adjust the flexibility of the bank for the display module utilizing the bank shown in FIG. 1, that exposes the end surface of the display panel out of the bank. Please refer to another embodiment shown in FIGS. 10A, 10B, and 10C. As shown in FIG. 10A, the supporting frame 110 has the sidewall 112 and the bank 114. The sidewall 112 has the supporting surface 116 formed inside the supporting frame 110. Slits 118 are formed at two sides of the bank 114 by down-cutting the sidewall 112. The bank 114 protrudes from the outer side of the supporting surface 116 of the sidewall 112 toward the direction away from the supporting surface 116, and the height of the sidewall 112 at two sides of the bank 114 is lower than the height of the bank 114. As shown in FIGS. 10A and 10B, the hole 120 is formed on the sidewall 112 and located below the bank 114.

Figure 10C:
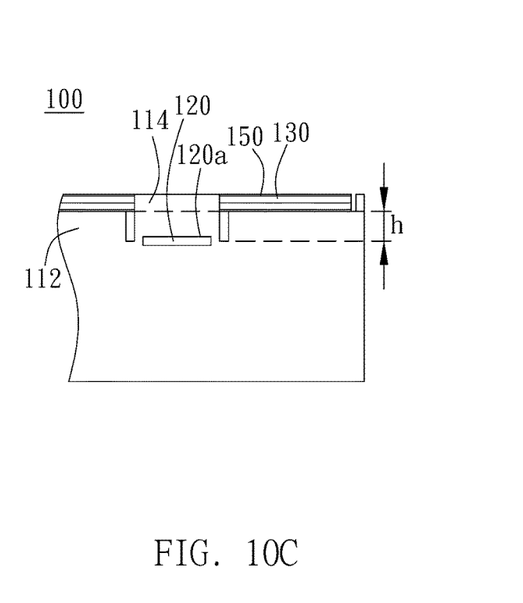

Please refer to the sided view shown in FIG. 10B, the hole 120 is located below the bank 114. The bottom surface 134 of the display panel 130 is supported by the supporting surface 116. The bank 114 faces the end surface 132 of the display panel 130. As shown in FIG. 10C, the display panel 130 is located on the supporting surface (the horizontal position of the supporting surface is labeled as the broken line on the bank 114). A portion of the end surface of the display panel 130 is shielded by the bank 114, and other portion of the same is exposed out of the sidewall 112 and the bank 114.

Please refer to FIGS. 10A and 10C. As shown in FIG. 10A, slits are formed between the sidewall 112 and two sides of the bank 114. As shown in the sided view of FIG. 10C, the slit 118 has sufficient depth (h) to go beyond the top edge 120a of the hole 120. In other words, the slit 118 extends downwardly to the horizontal position lower than the top edge 120a of the hole 120, so that the bank 114 connects the sidewall 112 only at two sides of the hole 120. By this design, two sides of the bank 114 separate from the sidewall 112, and the connection area of the lower portion of the bank 114 and the sidewall 112 is reduced. As such, the bank 114 constrains the horizontal movement of the display panel 130 while the hole 120 increases the flexibility of the bank 114 to reduce the lateral force exerted on the display panel 130 when the display panel 130 is pressed by the supporting frame 110, and thus the light leakage phenomenon can be reduced.

To sum up, the display module of the present invention can fix the display panel by utilizing the banks, and the banks with flexibility can reduce the light leakage phenomenon caused by the compression from the supporting frame to the display panel. By design of the banks, the lateral force exerted on the display module can be reduced when the supporting frame presses the display module, and uneven light distribution caused by light leakage around the display device can be reduced to improve display result.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:
1. A display module, comprising:
a support frame having:
a sidewall having a supporting surface; and
at least a bank protruding from an outer side of the supporting surface toward a direction away from the supporting surface,
wherein slits are formed at two sides of the at least one bank by down-cutting the sidewall and the supporting surface;
a portion of the supporting surface between two sides of the bank is separated from the other portion of the supporting surface; a hole is formed on the sidewall below the bank; the bank has a lower portion corresponding to the hole; a center part of the lower portion is separated from the sidewall; two sides of the lower portion are connected to the sidewall; a top edge of the hole is lower than the supporting surface;

a display panel disposed on the support frame, wherein a bottom surface of the display panel is supported by the supporting surface, and the bank faces an end surface of the display panel;

an outer frame covering the display panel and surrounding the sidewall, wherein a through hole is formed on the outer frame and corresponds to the bank for allowing the bank to move toward the through hole; and a buffer material filled between the outer frame and the end surface of the display panel, wherein the support frame comprises a plurality of banks corresponding to other end surfaces of the display panel, respectively.

2. The display module of claim 1, wherein each of the slits has a depth going beyond the top edge of the hole.

3. The display module of claim 2, wherein the slit has a depth going beyond a bottom edge of the hole.

4. The display module of claim 1, wherein a width ratio of the bank to the hole in a direction parallel to the supporting surface is between 7:3 and 7:6.

5. The display module of claim 4, wherein the width ratio of the bank to the hole in the direction parallel to the supporting surface is substantially 7:5.

6. The display module of claim 1, wherein the hole is elongated and perpendicular to slits.

7. The display module of claim 1, wherein the sidewall at two sides of the bank has the same height as the bank, and the bank retreats from two sides of the sidewall.

8. A display module, comprising:
a support frame having:
a sidewall having a supporting surface; and
at least a bank protruding from an outer side of the supporting surface toward a direction away from the supporting surface,
wherein slits are formed at two sides of the bank by down-cutting the sidewall and the supporting surface; a portion of the supporting surface between two sides of the bank is separated from the other portion of the supporting surface; a hole is formed on the sidewall underneath the bank; the bank has a lower portion corresponding to the hole; a center part of the lower portion is separated from the sidewall; two sides of the lower portion are connected to the sidewall; a top edge of the hole is lower than the supporting surface;

a display panel disposed on the support frame, wherein a bottom surface of the display panel is supported by the supporting surface, a portion of an end surface of the display panel is shielded by the bank, and other portions of the end surface of the display panel are exposed out of the sidewall and the bank;

an outer frame covering the display panel and surrounding the sidewall, wherein a through hole is formed on the outer frame and corresponding to the bank for allowing the bank to move toward the through hole; and a buffer material filled between the outer frame and the portion of the end surface of the display panel, wherein the support frame comprises a plurality of banks corresponding to the other portions of the end surfaces of the display panel.

9. The display module of claim 8, wherein at least one of the slits has a depth going beyond a top edge of the hole.

10. The display module of claim 8, wherein at least one of the slits has a depth going beyond a bottom edge of the hole.

11. The display module of claim 8, wherein a width ratio of the bank to the hole in a direction parallel to the supporting surface is between 7:3 and 7:6.

12. The display module of claim 11, wherein the width ratio of the bank to the hole in the direction parallel to the supporting surface is substantially 7:5.

13. The display module of claim 8, wherein the hole is elongated and perpendicular to at least one of the slits.

* * * * *